US012811816B2

(12) United States Patent
Törnkvist

(10) Patent No.: US 12,811,816 B2
(45) Date of Patent: Nov. 24, 2026

(54) CHARGING FUNCTIONS AND METHODS FOR UPDATING CHARGING RESOURCES

(71) Applicant: Telefonaktiebolaget LM Ericsson (publ), Stockholm (SE)

(72) Inventor: Robert Törnkvist, Karlskrona (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 293 days.

(21) Appl. No.: 18/699,098

(22) PCT Filed: Oct. 8, 2021

(86) PCT No.: PCT/SE2021/050989

§ 371 (c)(1),
(2) Date: Apr. 5, 2024

(87) PCT Pub. No.: WO2023/059234

PCT Pub. Date: Apr. 13, 2023

(65) Prior Publication Data

US 2024/0406015 A1 Dec. 5, 2024

(51) Int. Cl.
*H04L 12/14* (2006.01)

(52) U.S. Cl.
CPC ...... *H04L 12/1403* (2013.01); *H04L 12/1457* (2013.01)

(58) Field of Classification Search
CPC ........................ H04L 12/1403; H04L 12/1457
See application file for complete search history.

(56) References Cited

U.S. PATENT DOCUMENTS

2014/0011472 A1 1/2014 Sharma et al.
2019/0281426 A1 9/2019 Li et al.
(Continued)

FOREIGN PATENT DOCUMENTS

CN 112449316 A 3/2021
KR 10-2019-0092441 A1 8/2019
(Continued)

OTHER PUBLICATIONS

"3rd Generation Partnership Project; Technical Specification Group Services and System Aspects; Telecommunication management; Charging management; (Release 10)", #GPP Standard; 3GPP TS 32.299, 3rd Generation Partnership Project (3GPP), vol. SA WG5, No. V10.9.0, Mar. 15, 2013, pp. 1-149, XPP050692. (Year: 2013).*
(Continued)

*Primary Examiner* — Myron Wyche
(74) *Attorney, Agent, or Firm* — Rothwell, Figg, Ernst & Manbeck, P.C.

(57) ABSTRACT

A method (400) performed by a first CHF. The method includes receiving a first request message transmitted by a first network function, wherein the first request message relates to a chargeable service requested by a subscriber. The method also includes, after receiving the first request message, transmitting a second request message to a second network function (e.g., RF, ABMF, or second CHF) and receiving from the second network function a first response message responsive to the second request message, wherein the first response message includes a first resource identifier identifying a first resource created by the second network function or a third network function. The method also includes, after receiving the first response message transmitted by the second network function, transmitting to the first network function a second response message responsive to the first request message, wherein the second response message includes the first resource identifier received from the second network function.

24 Claims, 8 Drawing Sheets

(56) References Cited

U.S. PATENT DOCUMENTS

| | | | | |
|---|---|---|---|---|
| 2020/0244082 A1 | 7/2020 | Chai | | |
| 2021/0234965 A1* | 7/2021 | Kaki | ..................... | H04M 15/00 |
| 2022/0038871 A1 | 2/2022 | Chai | | |

FOREIGN PATENT DOCUMENTS

| | | | | | |
|---|---|---|---|---|---|
| WO | 2021/022916 A1 | | 2/2021 | | |
| WO | WO2021/022916 | * | 2/2021 | ......... | H04L 12/1403 |
| WO | 2021/144041 A1 | | 7/2021 | | |

OTHER PUBLICATIONS

International Search Report and Written Opinion issued in International Application No. PCT/SE2021/050989 dated Jun. 16, 2022 (11 pages).
3GPP TS 32.290 V16.9.0 (Sep. 2021) (37 pages).
3GPP TS 32.290 V17.3.0 (Sep. 2021) (38 pages).
ETSI TS 132 290 V16.8.0 (Aug. 2021) (41 pages).
3GPP TS 32.291 V17.0.0 (Sep. 2021) (141 pages).
ETSI TS 132 291 V16.8.1 (Aug. 2021) (147 pages).
ETSI TS 129 501 V16.6.0 (Aug. 2021) (81 pages).
3GPP TS 29.501 V17.3.1 (Sep. 2021) (79 pages).
Berners-Lee, T., "Uniform Resource Identifier (URI) : Generic Syntax", Networking Group, Jan. 2005 (61 pages).

* cited by examiner

CHARGING FUNCTIONS AND METHODS FOR UPDATING CHARGING RESOURCES

CROSS REFERENCE TO RELATED APPLICATIONS

This application is a 35 U.S.C. § 371 National Stage of International Patent Application No. PCT/SE2021/050989, filed 2021 Oct. 8.

TECHNICAL FIELD

This disclosure relates to a charging system.

BACKGROUND

The Third Generation Partnership Project (3GPP) has specified a service-based architecture in 3GPP TS 32.290 v16.8.0 ("TS 32.290"). According to this architecture a network function (NF) (e.g., a Charging Trigger Function (CTF)) may request charging from a Converged Charging system (CCS). More specifically, the NF requests charging from a Charging Function (CHF) of the CCS, which, among other things, is responsible for generating charging data records. In addition to including the CHF, the CCS also includes: an Account Balance Management Function (ABMF), which holds subscriber account balances and any reservations, and a Rating Function (RF), which determines a value of a network resource usage.

When a charging request transmitted by an NF is received at the CHF, the CHF processes the request (e.g., creates a resource for charging) and transmits a response. The response may include a location header that includes a resource identifier (e.g., a Uniform Resource Identifier (URI)) identifying the resource created by the CHF in response to the request and an optional binding indication. A resource may be an entry in a storage at the CHF such as data received in conjunction with charging requests from a Network Function acting as charging client. This data includes charging data received for the charging session but may also relate to earlier sessions. The binding indication indicates the connection to which the resource is bound, i.e., whether the resource is available and can be obtained from a single NF service instance, NF instance, or an NF set. The resource identifier may have the following form:

{apiRoot}/<apiName>/<api Version>/<apiSpecificResourceUriPart>, as described in 3GPP TS 29.501 v16.6.0 ("TS 29.501") clause 4.4. The {apiRoot} portion of the resource identifier includes a protocol identifier (e.g., http or http) and a host identifier (e.g., a registered name (e.g., name.com) or a network address (e.g., an IP address)). The <apiSpecificResourceeUriPart> portion is a resource identifier relative to {apiRoot}/<apiName>/<apiVersion>/(i.e., the "API URI"). Accordingly, when the NF wants a CHF to update the resource, the NF can identify the resource to the CHF. Such resource may be the rating group, IMSI, or total number used units for the session. A resource may also refer to a directory, such as www (dot) ericsson (dot) com/Nchf_converged_charging/3.0.0/, containing all resources for a particular session. One type resource stored at the CHF may also be a reference to a resource stored at another CCS function, e.g. another CHF, ABMF or RF in the same or different CCS.

SUMMARY

Certain challenges presently exist. For example, when an NF wants a CHF to update a previously created charging resource, such as adding rating group or a location for the session or updating the number of used units for session, the NF transmits an update request that includes an identifier of the resource. The CHF that receives the update request may need to obtain one or more resource identifiers identifying a resource created by another CCS function (e.g., the ABMF and/or RF) but may not be able to locate these other resource identifiers. For example, the CHF may have lost the reference for the resource or lost the actual resource.

Accordingly, in one aspect there is provided a method performed by a first CHF to overcome this problem. In one embodiment, the method includes the first CHF receiving a first request message transmitted by a first network function, wherein the first request message relates to a chargeable service requested by a subscriber. The method also includes, after receiving the first request message, the first CHF transmitting a second request message to a second network function (e.g., RF, ABMF, or second CHF) and receiving from the second network function a first response message responsive to the second request message, wherein the first response message includes a first resource identifier identifying a first resource created by the second network function or a third network function. The method also includes, after receiving the first response message transmitted by the second network function, the first CHF transmitting to the first network function a second response message responsive to the first request message. The second response message includes the first resource identifier received from the second network function. The method also includes the first CHF receiving a charging data request message transmitted by a network function, wherein the charging data request message is not an initial charging data request message, and the charging data request message comprises a first resource identifier comprising a first host portion identifying a host and a first specific resource identifier portion. The method also includes the first CHF transmitting a request message to the host identified by the host portion of the first resource identifier, wherein the request message comprises the first specific resource identifier portion.

In another embodiment the method includes the first CHF receiving a first request message transmitted by a first network function, wherein the first request message relates to a chargeable service requested by a subscriber. The method also includes, after receiving the first request message, the first CHF transmitting a second request message to a second network function (e.g., RF, ABMF, or second CHF) and receiving from the second network function a first response message responsive to the second request message, wherein the first response message includes a first resource identifier identifying a first resource created by the second network function or a third network function. The method also includes, after receiving the first response message transmitted by the second network function, the first CHF transmitting to the first network function a second response message responsive to the first request message. The second response message includes the first resource identifier received from the second network function.

In another embodiment, the method includes the first CHF receiving a charging data request message transmitted by a network function, wherein the charging data request message is not an initial charging data request message, and the charging data request message comprises a first resource identifier comprising a first host portion identifying a host and a first specific resource identifier portion. The method also includes the first CHF transmitting a request message to the host identified by the host portion of the first resource identifier, wherein the request message comprises the first specific resource identifier portion.

In another aspect there is provided a computer program comprising instructions which when executed by processing circuitry of a CHF causes the CHF to perform any of the methods disclosed herein. In one embodiment, there is provided a carrier containing the computer program wherein the carrier is one of an electronic signal, an optical signal, a radio signal, and a computer readable storage medium.

In another aspect there is provided a CHF that is configured to perform the methods disclosed herein. In some embodiments, the CHF comprises memory and processing circuitry coupled to the memory, wherein the memory contains instructions executable by the processing circuitry to configure the CHF to perform the methods disclosed herein.

An advantage of the embodiments disclosed herein is that they enable a CHF to be completely stateless (i.e., the CHF does not need to store the resources identifiers that it receives from other CCS function). Thus, if the CHF fails, then any other CHF can take over. The embodiments also allow the ABMF/RF to not be collocated with each other or with the CHF and also makes the CHF to CHF interaction more fault tolerant.

BRIEF DESCRIPTION OF THE DRAWINGS

The accompanying drawings, which are incorporated herein and form part of the specification, illustrate various embodiments.

DETAILED DESCRIPTION

Figure 1:
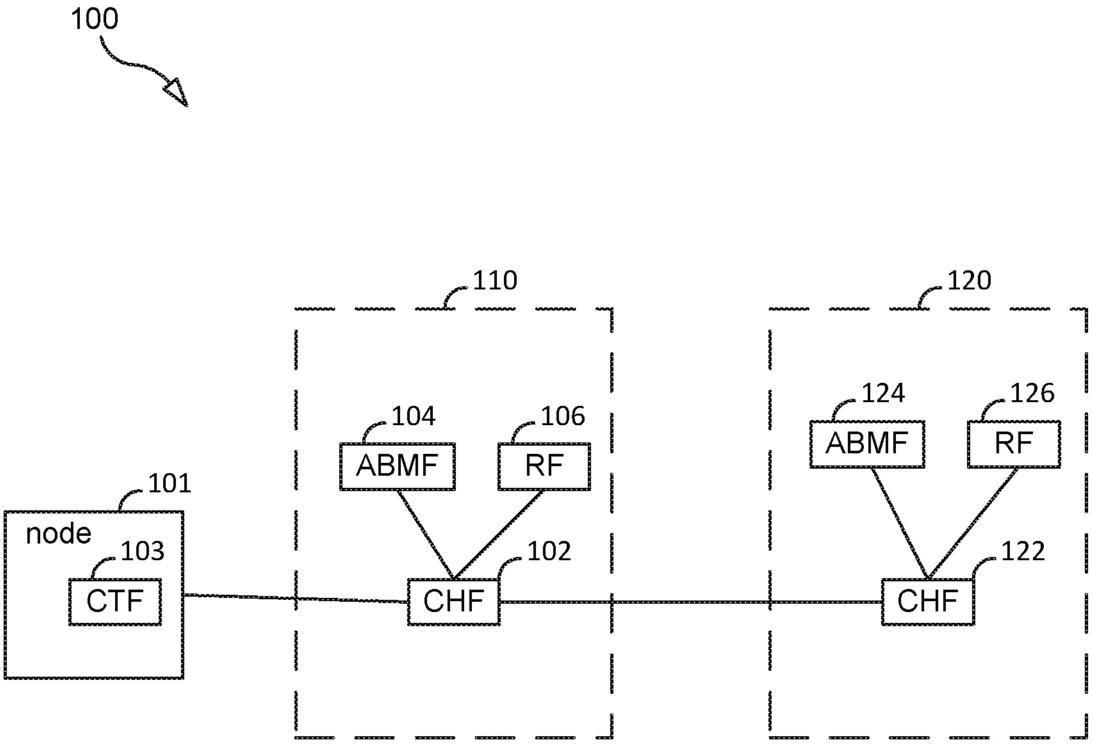
FIG. 1 illustrates a system according to some embodiments.

FIG. 1 illustrates a system 100 according to some embodiments. In the embodiment shown, system 100 includes a network node 101 (e.g., a virtual or non-virtual machine) and two service deployment clusters (SDCs) 110 and 120. The first SDC 110 includes a first CHF 102, a first ABMF 104, and a first RF 106. Similarly, the second SDC 120 includes a second CHF 122, a second ABMF 124, and a second RF 126.

Network node 101 can implement or comprises any network function in the 3GPP 5G core context, even another CHF. In one embodiment, network node 101 comprises a Session Management Function (SMF), which may include a Charging Trigger Function (CTF) 103, that consumes the services provided by the CHF (e.g., the Nchf services).

The network node 101 requests creation of a charging resource at the CHF 102, and the CHF 102 may then, depending on internal configuration, request resources to be created at ABMF 104 and RF 106. In the example of FIG. 1, two SDCs are shown to illustrate that there might be linking of resources not just within CHF 102 but also CHF 122 (e.g., where one CHF is for enterprise charging and the other CHF is for end user charging). In this case, the CHF 102 of SDC 110 will, at the request from the network node 101 request a resource to be created on the CHF 122 in SDC 120. Both the CHF 102 and the CHF 122 may create resources in the ABMF and RF two which they are connected.

Figure 2A:
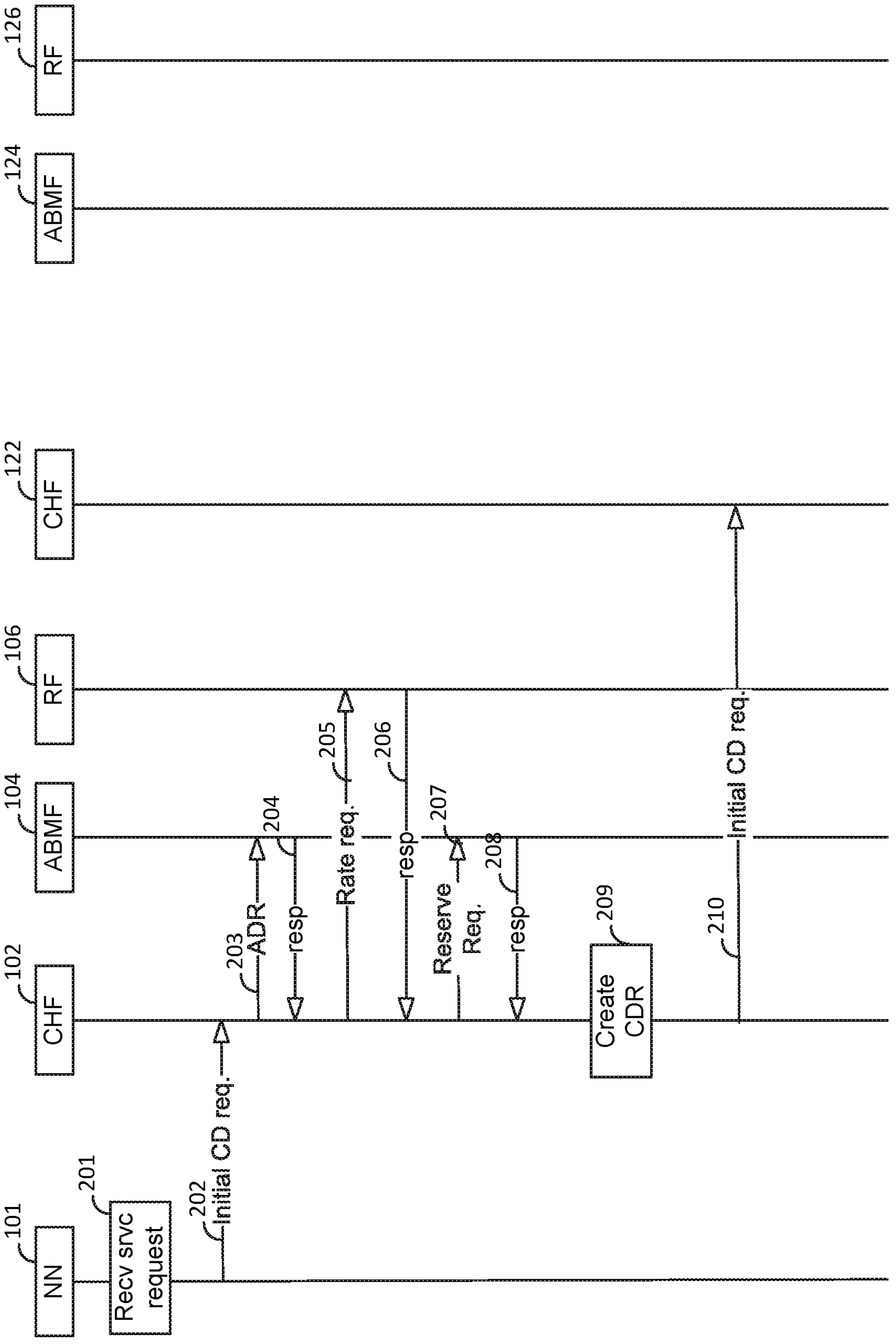
FIGS. 2A and 2B illustrates an example message flow.
Figure 2B:
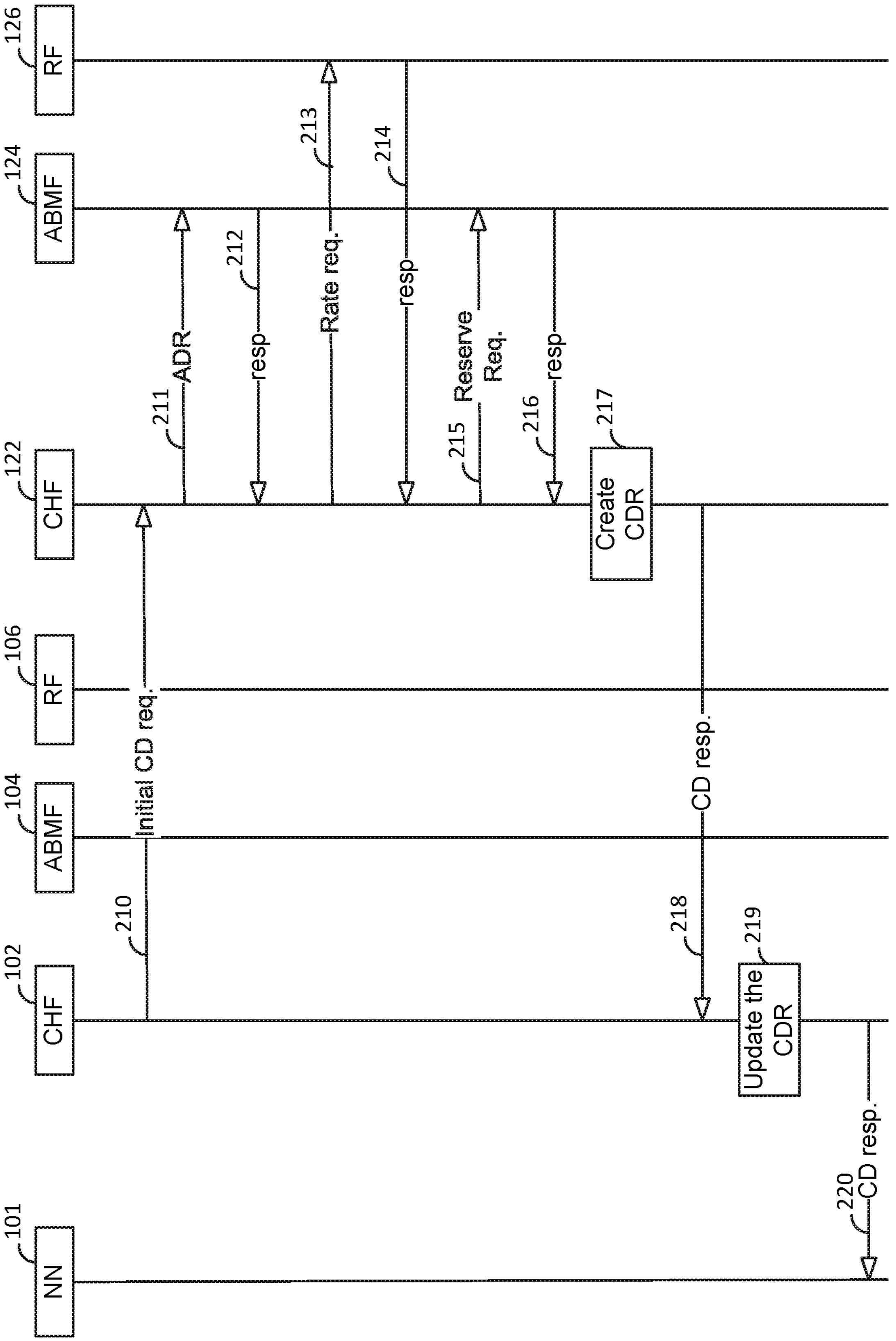

FIGS. 2A and 2B are message flow diagrams illustrating a process according to some embodiments. The process includes the following steps:

Step 201: Network node 101 receives a request for a service that is provided by the NF (e.g. video streaming, internet connection). For example, network node 101 may be an SMF that receives a session establishment request.

Step 202: After receiving the request, network node 101 determines that the requested service is chargeable and may require quota monitoring, and, therefore, network node 101 sends an initial charging data (CD) request message to CHF 102 requesting recording and possibly quota for the service.

Step 203: In response to receiving the charging data request [initial] transmitted by network node 101, CHF 102 decides, based on charging information included in the charging data request and internal configuration, whether or not it needs to get account information (e.g., account information for an enterprise (e.g. the MVNO, HPLMN operator, company)). As a result of determining that it needs to get account information, CHF 102 transmits to ABMF 104 an account data request (ADR). For example, CHF 102 transmits to ABMF 104 a Hypertext Transfer Protocol (HTTP) message (e.g., an HTTP GET message or an HTTP POST message) requesting account data for a specified account.

Step 204: ABMF 104 checks the account and responds with an account data response that includes the request account information (e.g., the account information identifies services the enterprise has and which buckets/balances that can be used as well as their values).

Step 205: After receiving the account data response, CHF 102 decides, based on the charging information, the account information, and internal configuration whether it needs to rate the service before it can reserve anything from the account. In response to determining that it needs to rate the service, CHF 102 transmits to RF 106 a rate request (RR) message for a reservation comprising the charging information and the account information.

Step 206: In response to receiving the rate request message, RF 106 rates the event based on charging information, the account data, and internal configuration, and responds by sending to CHF 102 a rate response message that includes information indicating an amount to reserve. Additionally, if required to be able to continue the rating where it left of at the next request, RF 106 includes in the rate response a resource identifier. For example, the resource identifier may be of the form:

http://rf_106.com/rating/v1/ratinginfo/QweRTY09876, where "QweRTY09876" is a unique reference that is generated for the specific rate request so that it can be differentiated from other requests.

Step 207: In response to receiving the rate response from RF 106, CHF 102 decides, based on the information included in the rate response, that it needs to reserve from the account. Accordingly, CHF 102 transmits to ABMF 104 a reserve request (e.g., Account Data Request [Reserve]).

Step 208: ABMF 104, in response to receiving the reserve request, checks the account and then transmits to CHF 102 an account data response comprising information indicating the reserved amount. The account data response may also include a resource identifier for the reservation. For example, the resource identifier may be of the form:

http://abmf_104.com/accountbalancemanagement/v1/accountinfo/876asdF, where "876asdF" is a unique reference that is generated for the specific rate request so that it can be differentiated from other requests.

Step 209: CHF 102 decides based on the charging information and internal configuration that it needs to create a record with the charging information and reservations made. That is, CHF 102 records the information by creating a Charging Data Record (CDR) that contains the information.

Step 210: In this example, CHF 102 determines, based the charging information, account data, and internal configuration, whether the service is chargeable by CHF 122. If it is, then CHF 102 sends to CHF 122 an initial charging data request requesting recording and possibly quota for the service.

Step 211: In response to receiving the Charging Data Request [initial] transmitted by CHF 102, CHF 122 decides, based on charging information included in the charging data request and internal configuration, whether or not it needs to get account information for the end user (e.g. the UE, subscriber, employee). As a result of determining that it needs to get account the information for the end user, CHF 122 transmits to ABMF 124 an account data request. For example, CHF 102 transmits to ABMF 124 an HTTP GET request message requesting account data for a specified account.

Step 212: ABMF 104 checks the account and responds with an account data response that includes the request account information (e.g., information identifying services the end user has access to and which buckets/balances that can be used as well as their values).

Step 213: After receiving the account data response, CHF 122 decides, based on the charging information, the account information, and internal configuration whether it needs to rate the service before it can reserve anything from the account. In response to determining that it needs to rate the service, CHF 122 transmits to RF 126 a rate request message for a reservation comprising the charging information and the account information.

Step 214: In response to receiving the rate request message, RF 126 rates the event based on charging information, the account data, and internal configuration, and responds by sending to CHF 122 a rate response message that includes information indicating an amount to reserve. Additionally, if required to be able to continue the rating where it left of at the next request, RF 126 includes in the rate response a resource identifier. For example, the resource identifier may be of the form:

http://rf_126.com/rating/v1/ratinginfo/hyde4747dhckp1, where

"hyde4747dhckp1" is a unique reference generated by RF 126 and associated with the rate request.

Step 215: In response to receiving the rate response from RF 126, CHF 122 decides, based on the information included in the rate response, that it needs to reserve from the account. Accordingly, CHF 122 transmits to ABMF 124 a reserve request (e.g., Account Data Request [Reserve]).

Step 216: ABMF 124, in response to receiving the reserve request, checks the account and then transmits to CHF 122 an account data response comprising information indicating the reserved amount. The account data response may also include a resource identifier for the reservation. For example, the resource identifier may be of the form:

http://abmf_124.com/accountbalancemanagement/v1/accountinfo/b74lap69, where "b74lap69" is a unique reference generated by ABMF 124 and associated with the reserve request.

Step 217: CHF 122 decides based on the charging information and internal configuration that it needs to create a record with the charging information and reservations made. That is, CHF 122 records the information by creating a Charging Data Record (CDR) that contains the information.

Step 218: CHF 122 now responds to the request message transmitted by CHF 102 by transmitting to CHF 102 a charging data response message. In one embodiment, the charging data response message includes a resource identifier created by CHF 122. This resource identifier may be of the form:

http://chf_122.com/nchf-covergedcharging/v3/chargingdata/Asdf1234q, where

"Asdf1234q" is a unique reference generated by CHF 122 and associated with the charging data request from CHF 102. This resource can be used by another CHF if CHF 122 fails.

Additionally, in some embodiments, the charging data response message transmitted by CHF 122 to CHF 102 may further include the resource identifier received from ABMF 124 and the resource identifier received from RF 126. In such an embodiment, the charging data response message transmitted by CHF 122 to CHF 102 may include the following linkedResources data structure (a.k.a., information element (IE)):

TABLE 1

```
linkedResources{
  "RF": "http://rf__126.com/rating/v1/ratinginfo/hyde4747dhckp1"
  "ABMF":"http://abmf__124.com/accountbalancemanagement/v1/accountinfo/b74lap69"
"CHF": "http://chf__122.com/nchf-covergedcharging/v3/chargingdata/Asdf1234q"
}
```

As illustrated above, the linkedResources IE includes three records, where each record includes a field storing a resource identifier (e.g., a Uniform Resource Identifier (URI)) and an associated field storing a network function identifier (e.g., "CHF" or "RF") that identifies the function associated with the resource identifier (e.g., the function from which CHF 122 obtained the resource identifier).

Step 219: After receiving the charging data response message transmitted by CHF 122, CHF 102 decides, based on the response and internal configuration, whether it needs to update the CDR created in Step 209 with information from the charging data response message. If so, CHF 102 included the information in the CDR.

Step 220: CHF 102 now responds to the request message transmitted by network node 101 by transmitting to network node 101 a charging data response message with linked resources created to provide the charging service. For example, in one embodiment, the charging data response message transmitted by CHF 102 includes a resource identifier created by CHF 102. This resource identifier may be of the form:

http://chf_102.com/nchf-covergedcharging/v3/charging-data/ujhge437, where

"ujhge437" is a unique reference generated by CHF 102 and associated with the request from network node 101.

Additionally, in some embodiments, the charging data response message transmitted by CHF 102 to NF 102 may further include the resource identifier received from ABMF 104, the resource identifier received from RF 106, and all of the resource identifiers received from CHF 122. In such an embodiment, the charging data response message transmitted by CHF 102 to CHF 104 may include the following two IEs (serviceDeploymentClusters and linkedResources):

TABLE 2

```
serviceDeploymentClusters {
"CHF", "http://chf_122.com/nchf-covergedcharging/v3/chargingdata/Asdf1234q"
"ABMF", "http://abmf_124.com/accountbalancemanagement/v1/accountinfo/b74lap69"
"RF", "http://rf_126.com/rating/v1/ratinginfo/hyde4747dhckp1"
}
linkedResources{
"CHF": "http://chf_102.com/nchf-covergedcharging/v3/chargingdata/ujhge437"
"ABMF": "http://abmf_104.com/accountbalancemanagement/v1/accountinfo/876asdF"
"RF": "http://rf_106.com/rating/v1/ratinginfo/QweRTY09876"
}
```

The steps 203 to 208 and 211 to 217 may be done in different order or multiple times depending on CHF implementation and what is needed from a request point of view.

To avoid a lot of signaling the ABMF and RF may be combined and in that case the CHF would just do a request like "rate and reserve" to the AMBF+RF.

Figure 3:
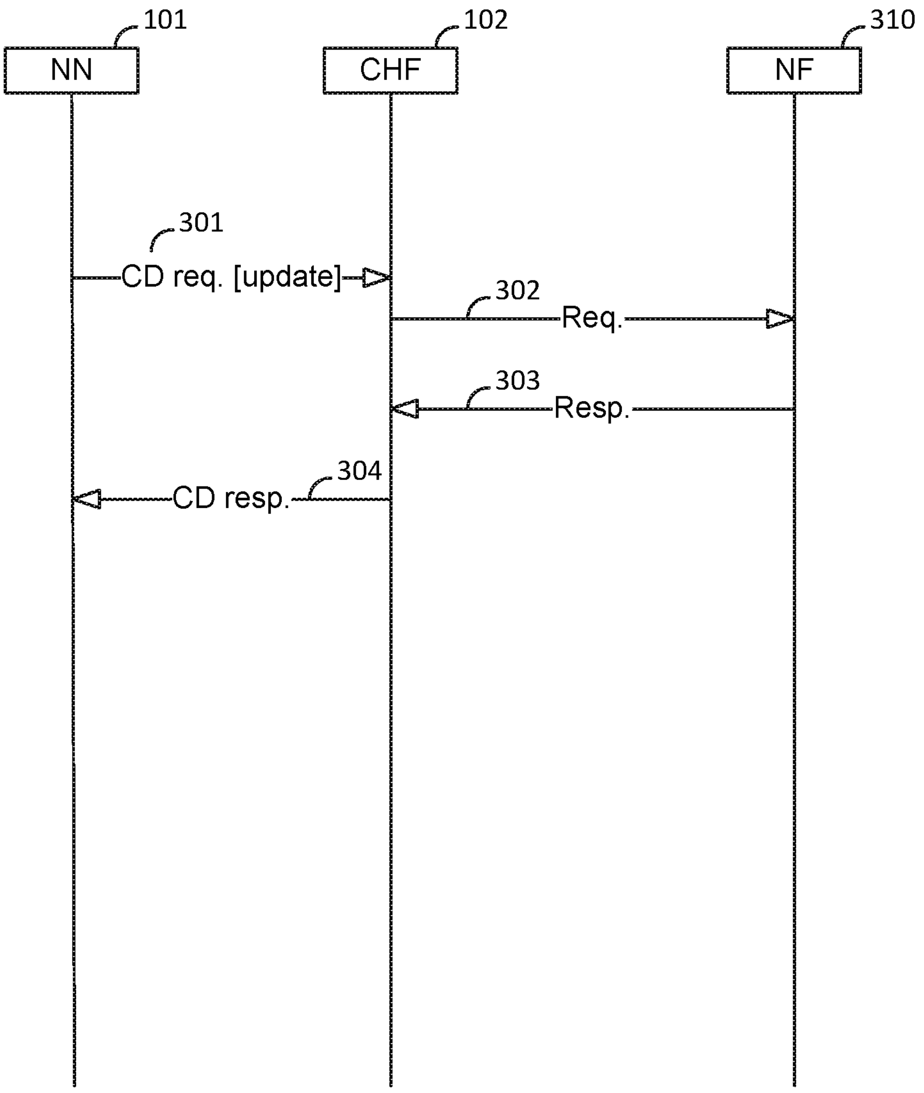
FIG. 3 illustrates an example message flow.

FIG. 3 is a message flow diagram illustrating a process according to some embodiments. The message flow shown in FIG. 3 assumes that network node 101 received the charging data response message transmitted by CHF 102 in step 220 of FIG. 2B and includes the following steps Step 301: Network node 101 transmits an update charging data request message containing the resource identifiers contained in the charging data response message transmitted by CHF 102 in step 220. For example, the update message may include the two IEs shown in Table 2. This update charging data request message is received at a CHF (e.g., CHF 102 or another CHF) in SDC 110.

Step 302: After receiving the update message, the CHF transmits a request message to another network function 310 (e.g., ABMF 104, RF 106, or CHF 122). If the request message is sent to ABMF 104, then the request message includes the ABMF resource identifier included in the linkedResources IE of the update request message (e.g., http://abmf_104.com/accountbalancemanagement/v1/accountinfo/876asdF). If the request message is sent to RF 104, then the request message includes the RF resource identifier included in the linkedResources IE of update request message (e.g., http://rf_106.com/rating/v1/ratinginfo/QweRTY09876). Similarly, if the request message is sent to CHF 122, then the request message includes the serviceDeploymentClusters, which, as shown in Table 2, includes three resource identifiers.

Step 303: The network function 310 transmits a response to the CHF. The response may include a resource identifier generated by network function 310.

Step 304: The CHF transmits a charging data response responsive to the update charging data request message. The charging data response may include all or some of the resource identifiers included in the update charging data request message. Additionally, if the response received in step 303 includes a resource identifier, then this resource identifier is included in the charging data response message.

In one embodiment, the body of the charging data request message transmitted in step 301 may include one or more of the information elements (e.g., attribute-value pairs) described in the table below:

TABLE 3

| Attribute name | Data type | Description |
|---|---|---|
| subscriberIdentifier | Supi | Identifier of the subscriber that uses the requested service. |
| nfConsumerIdentification | NFIdentification | This is a grouped field which contains a set of information identifying the NF consumer of the charging service. |
| chargingId | ChargingId | Charging identifier for correlation between different records. Only applicable if not available in the service specific information. |
| invocationTimeStamp | DateTime | The time at which the request is send |
| invocationSequenceNumber | Uint32 | This field contains the sequence number of the charging service invocation by the NF consumer, i.e. the order |

TABLE 3-continued

| Attribute name | Data type | Description |
|---|---|---|
| | | of charging data requests. The sequence number in charging data request [initial] starts from 1, and increased by 1 for subsequent charging data request. It is allowed to start from 0 for backwards compatibility. |
| retransmissionIndicator | boolean | This field indicates, if included, this is a retransmitted request message. |
| oneTimeEvent | boolean | Indicates, if included, that this is event based charging and whether this is a one-time event. If true, this is a one-time event that there will be no update or release. |
| oneTimeEventType | EventType | Indicates the type of the one time event, i.e. Immediate or Post event charging. |
| notifyUri | URI | Identifies the recipient of Notifications sent by the CHF. In case of session based charging it shall be present in create request message, and may be present in update. |
| supportedFeatures | SupportedFeatures | This IE shall be present if at least one optional feature defined in clause 6.1.8 is supported. |
| serviceSpecificationInfo | String | Identifies service specific document that applies to the request, e.g. the service specific document ('middle tier' TS) and 3GPP release the service specific document is based upon. |
| multipleUnitUsage | array(MultipleUnitUsage) | This field contains the parameters for the quota management request and/or usage reporting. |
| triggers | array(Trigger) | This field identifies the event(s) triggering the request. |
| serviceDeploymentClusters | array(linkedResources) | This field contains a set of one or more linkedResources where each linkedResource is associated with a different service deployments cluster. An example of this IE is shown in Table 2 above. |
| linked Resources | map(URI) | This field contains one or more resource identifiers (RIs) and, for each RI, an identity mapped to the RI. An example of this IE is shown in Table 1 above. |

In one embodiment, the body of the charging data response message may include one or more of the information elements (e.g., attribute-value pairs) described in the table below:

TABLE 4

| Attribute name | Data type | Description |
|---|---|---|
| invocationTimestamp | Date Time | This field holds the timestamp of the charging service response from the CHF. |
| invocationResult | InvocationResult | This field holds the result of charging service invocation by the NF consumer |

TABLE 4-continued

| Attribute name | Data type | Description |
|---|---|---|
| invocationSequenceNumber | Uint32 | This field contains the sequence number of the charging service invocation by the NF consumer. The same value of the sequence number received in the request should be used in the response |
| sessionFailover | SessionFailover | This field indicates whether alternative CHF is supported for ongoing charging service failover handling by NF consumer. |
| supportedFeatures | SupportedFeatures | This IE shall be present if at least one optional feature defined in clause 6.1.8 is supported. |
| multipleUnitInformation | array(MultipleUnitInformation) | This field holds the parameters for the quota management and/or usage reporting information. It may have multiple occurrences. |
| triggers | array(Trigger) | This field identifies the chargeable event(s) supplied by CHF to override/activate the existing chargeable event(s) in NF consumer. The presence of the triggers attribute without any triggerType is used by CHF to disable all the triggers except rating group level triggers. |
| serviceDeploymentClusters | array(linkedResources) | This field contains a set of one or more linkedResources where each linkedResource is associated with a different service deployments cluster. An example of this IE is shown in Table 2 above. |
| linkedResources | map(URI) | This field contains one or more resource identifiers (RIs) and, for each RI, an identity mapped to the RI. An example of this IE is shown in Table 1 above. |

Figure 4:
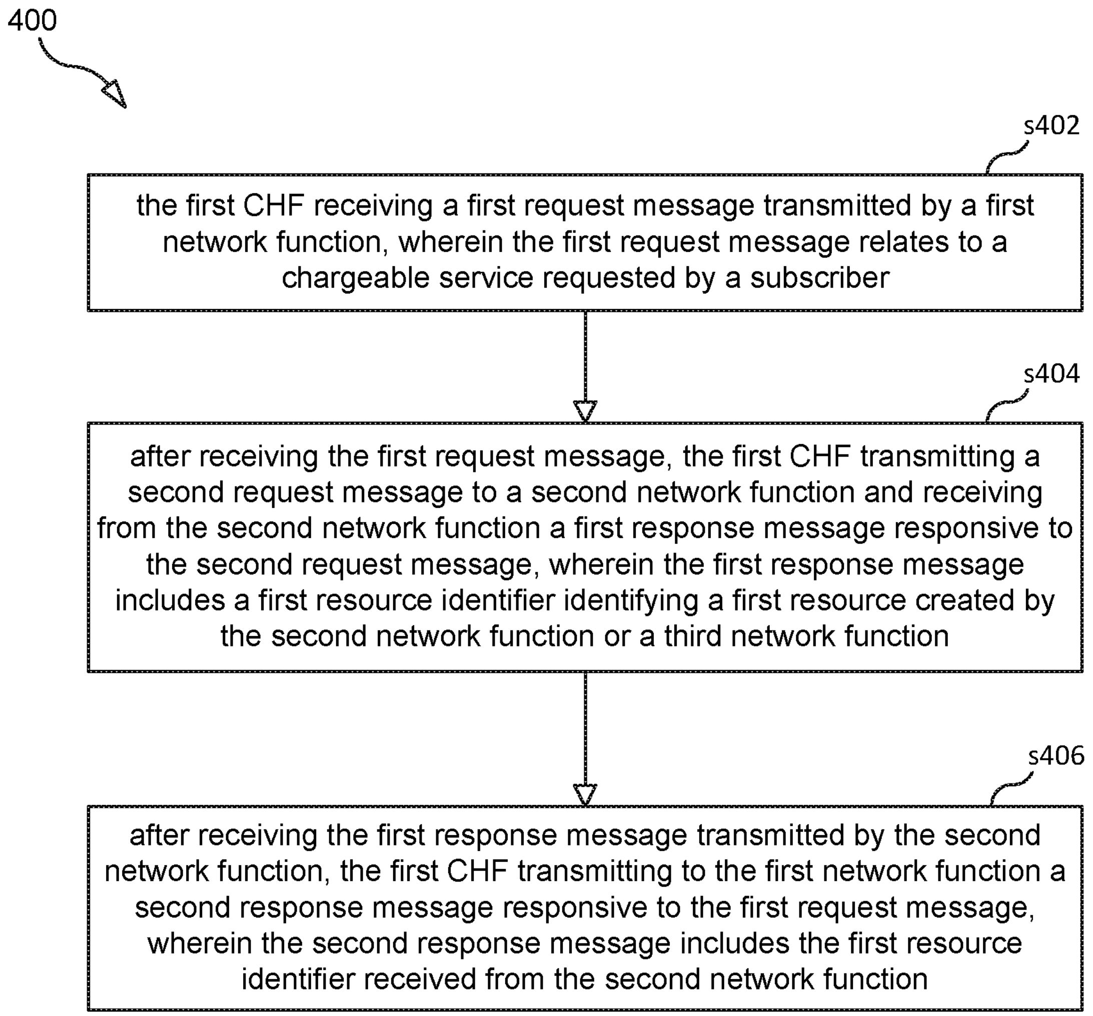
FIG. 4 is a flowchart illustrating a process according to some embodiments.

FIG. 4 is a flowchart illustrating a process 400 performed CHF 102. Process 400 may begin in step s402. Step s402 comprises CHF 102 receiving a first request message transmitted by a first network function (e.g., CTF 103 of network node 101), wherein the first request message relates to a chargeable service requested by a subscriber. Step s404 comprises, after receiving the first request message, CHF 102 transmitting a second request message to a second network function (e.g., RF 106, ABMF 104, or CHF 122) and receiving from the second network function a first response message responsive to the second request message, wherein the first response message includes a first resource identifier identifying a first resource created by the second network function or a third network function. Steps s406 comprises, after receiving the first response message transmitted by the second network function, CHF 102 transmitting to the first network function a second response message responsive to the first request message, wherein the second response message includes the first resource identifier received from the second network function.

In some embodiments, the first request message is an initial charging data request message (i.e., a message that initiates a charging session), and the second response message is a charging data response message responsive to the initial charging data request message.

In some embodiments, the second network function is an RF, the second request message is a rate request message, the first response message is a rate response message responsive to the rate request message, the rate response message further includes, in addition to the first resource identifier, information indicating an amount to reserve, and the first resource identified by the first resource identifier was created by the RF.

In some embodiments, the second network function is an ABMF, the second request message is a reservation request message, the first response message is a reservation response message responsive to the reservation request message, the reservation response message further includes, in addition to the first resource identifier, information indicating a reserved amount, and the first resource identified by the first resource identifier was created by the ABMF.

In some embodiments, the method also includes, after receiving the first request message and prior to transmitting the second request message, the first CHF determining, based on information included in the first request message, that the first CHF needs to obtain account information from an ABMF: as a result of determining the need to obtain the account information, the first CHF transmitting to the ABMF an account data request message requesting the account information; and the first CHF receiving from the ABMF an account data response message comprising the account information.

In some embodiments, the method also includes, before transmitting the second response message to the first network function, the first CHF determining that the chargeable service is chargeable by a second CHF, wherein the second CHF is the second network function; and as a result of determining that the chargeable service is chargeable by the second CHF, the first CHF transmitting to the second CHF the second request message, wherein the second request message is a second charging data request message. In some embodiments, the first CHF is a component of a first service deployment cluster the second CHF is a component of a second service deployment cluster the first response message further includes a second resource identifier identifying a resource created by an RF or an ABM of the second service deployment cluster, and the charging data response message responsive to the initial charging data request message further includes the second resource identifier.

In some embodiments, the method also includes, after transmitting the second response message to the first network function, receiving a second request message transmitted by the second network function, wherein the second request message comprises the first resource identifier.

In some embodiments, the first resource identifier is an absolute resource identifier that comprises a host portion identifying a host and a specific resource identifier, while in other embodiments the first resource identifier is a relative resource identifier that comprises the specific resource identifier.

Figure 5:
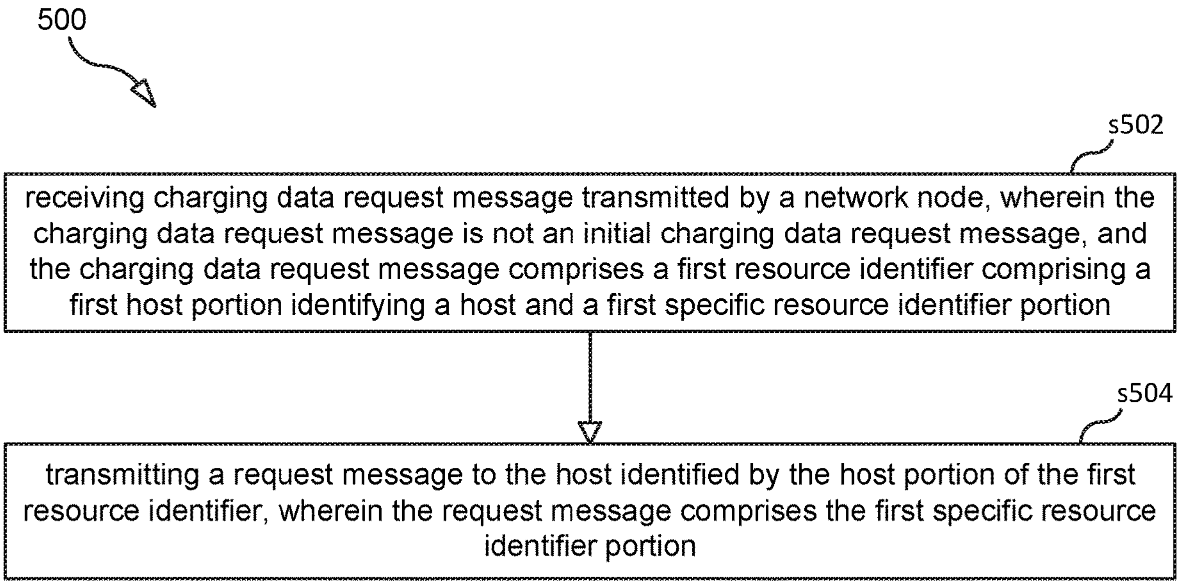
FIG. 5 is a flowchart illustrating a process according to some embodiments.

FIG. 5 is a flowchart illustrating a process 500 performed a first CHF (e.g., CHF 102). Process 500 may begin in step s502. Step s502 comprises CHF 102 receiving a charging data request message transmitted by a network function (e.g., CTF 103), wherein the charging data request message is not an initial charging data request message (i.e., the charging data request message is either an update message which updates a charging session or a termination message terminating the charging session), and the charging data request message comprises a first resource identifier comprising a first host portion identifying a host and a first specific resource identifier portion. Step s504 comprises CHF 102 transmitting a request message to the host identified by the host portion of the first resource identifier, wherein the request message comprises the first specific resource identifier portion.

In some embodiments, the charging data request message comprises a set of resource identifiers including the first resource identifier and a second resource identifier, and the request message transmitted to the host further comprises the second resource identifier. In some embodiments, the host is or comprises a second CHF.

Figure 7:
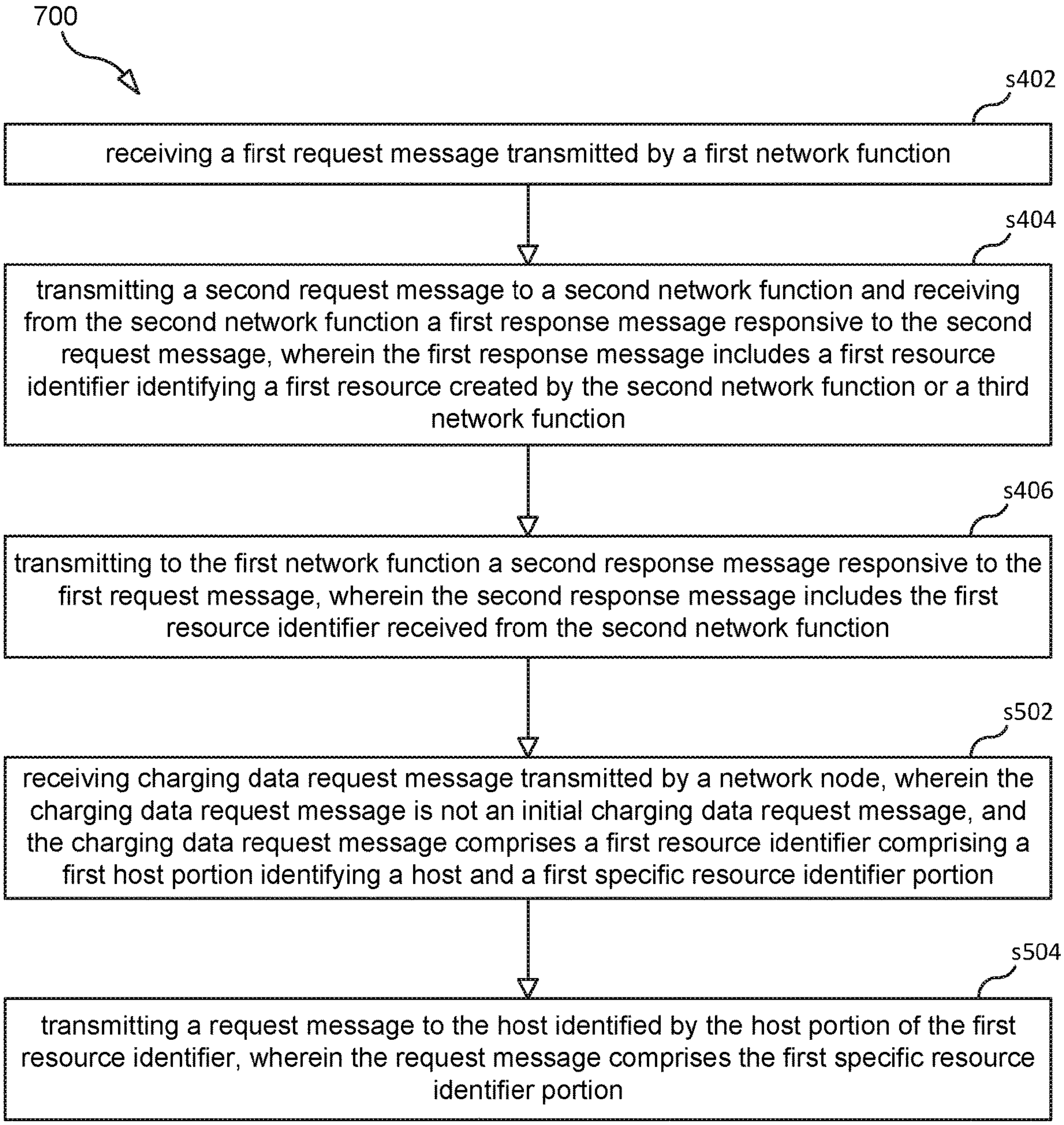
FIG. 7 is a flowchart illustrating a process according to some embodiments.

FIG. 7 is a flowchart illustrating a process 700 performed a first CHF (e.g., CHF 102). As shown in FIG. 7, process 700 includes the steps of process 400 followed by the steps of process 500.

Figure 6:
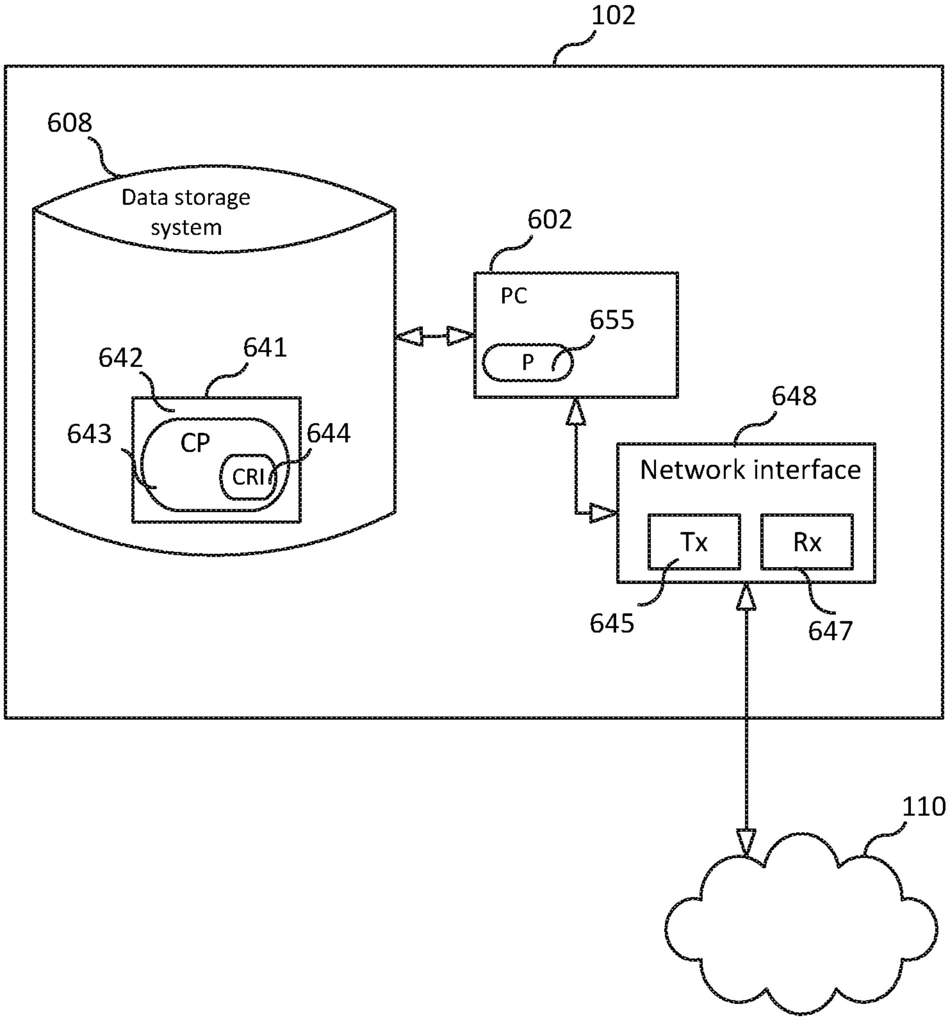
FIG. 6 is a block diagram of a CHF according to some embodiments.

FIG. 6 is a block diagram of CHF 102, according to some embodiments. As shown in FIG. 6, CHF 102 may comprise: processing circuitry (PC) 602, which may include one or more processors (P) 655 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., CHF 102 may be a distributed computing apparatus): at least one network interface 648 comprising a transmitter (Tx) 645 and a receiver (Rx) 647 for enabling CHF 102 to transmit data to and receive data from other nodes connected to a network 110 (e.g., an Internet Protocol (IP) network) to which network interface 648 is connected (directly or indirectly) (e.g., network interface 648 may be wirelessly connected to the network 110, in which case network interface 648 is connected to an antenna arrangement); and a storage unit (a.k.a., "data storage system") 608, which may include one or more non-volatile storage devices and/or one or more volatile storage devices. In an alternative embodiment the network interface 648 may be connected to the network 110 over a wired connection, for example over an optical fiber or a copper cable. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes CHF 102 to perform steps of the methods described herein (e.g., steps described herein with reference to one or more of the flow charts). In other embodiments, CHF 102 may be configured to perform steps of the methods described herein without the need for code. That is, for example, PC 602 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a first charging function (CHF), the method comprising:

the first CHF receiving a first request message transmitted by a first network function, wherein the first request message relates to a chargeable service requested by a subscriber;

after receiving the first request message, the first CHF transmitting a second request message to a second network function;

receiving from the second network function a first response message responsive to the second request message, wherein the first response message includes a first resource identifier identifying a first resource created by the second network function or a third network function;

after receiving the first response message transmitted by the second network function, the first CHF transmitting to the first network function a second response message responsive to the first request message, wherein the second response message includes the first resource identifier received from the second network function;

the first CHF receiving a charging data request message transmitted by a network function, wherein the charging data request message is not an initial charging data request message, and the charging data request message comprises a first resource identifier comprising a first host portion identifying a host and a first specific resource identifier portion; and the first CHF transmitting a request message to the host identified by the host portion of the first resource identifier, wherein the request message comprises the first specific resource identifier portion.

2. A method performed by a first charging function (CHF), the method comprising:

the first CHF receiving a first request message transmitted by a first network function, wherein the first request message relates to a chargeable service requested by a subscriber;

after receiving the first request message, the first CHF transmitting a second request message to a second network function;

receiving from the second network function a first response message responsive to the second request message, wherein the first response message includes a first resource identifier identifying a first resource created by the second network function or a third network function; and after receiving the first response message transmitted by the second network function, the first CHF transmitting to the first network function a second response message responsive to the first request message, wherein the second response message includes the first resource identifier received from the second network function.

3. The method of claim 1, wherein the first request message is an initial charging data request message, and the second response message is a charging data response message responsive to the initial charging data request message.

4. The method of claim 1, wherein the second network function is a Rating Function (RF), the second request message is a rate request message, the first response message is a rate response message responsive to the rate request message, the rate response message further includes, in addition to the first resource identifier, information indicating an amount to reserve, and the first resource identified by the first resource identifier was created by the RF.

5. The method of claim 1, wherein the second network function is an Account Balance Management Function (ABMF), the second request message is a reservation request message, the first response message is a reservation response message responsive to the reservation request message, the reservation response message further includes, in addition to the first resource identifier, information indicating a reserved amount, and the first resource identified by the first resource identifier was created by the ABMF.

6. The method of claim 4, wherein the method further comprises:

after receiving the first request message and prior to transmitting the second request message, the first CHF determining, based on information included in the first request message, that the first CHF needs to obtain account information from an Account Balance Management Function (ABMF);

as a result of determining the need to obtain the account information, the first CHF transmitting to the ABMF an account data request message requesting the account information; and the first CHF receiving from the ABMF an account data response message comprising the account information.

7. The method of claim 3, wherein the method further comprises:

before transmitting the second response message to the first network function, the first CHF determining that the chargeable service is chargeable by a second CHF, wherein the second CHF is the second network function; and as a result of determining that the chargeable service is chargeable by the second CHF, the first CHF transmitting to the second CHF the second request message, wherein the second request message is a second charging data request message.

8. The method of claim 7, wherein the first CHF is a component of a first service deployment cluster, the second CHF is a component of a second service deployment cluster, the first response message further includes a second resource identifier identifying a resource created by a Rating Function (RF) or an Account Balance Management Function (ABMF) of the second service deployment cluster, and the charging data response message responsive to the initial charging data request message further includes the second resource identifier.

9. The method of claim 1, wherein the method further comprises, after transmitting the second response message to the first network function, receiving a second request message transmitted by the second network function, wherein the second request message comprises the first resource identifier.

10. The method of claim 1, wherein the first resource identifier is an absolute resource identifier that comprises a host portion identifying a host and a specific resource identifier, or the first resource identifier is a relative resource identifier that comprises the specific resource identifier.

11. A method performed by a first charging function (CHF), the method comprising:

the first CHF receiving a charging data request message transmitted by a network function, wherein the charging data request message is not an initial charging data request message, and the charging data request message comprises a first resource identifier comprising a first host portion identifying a host and a first specific resource identifier portion; and the first CHF transmitting a request message to the host identified by the host portion of the first resource identifier, wherein the request message comprises the first specific resource identifier portion.

12. The method of claim 11, wherein the charging data request message comprises a set of resource identifiers including the first resource identifier and a second resource identifier, and the request message transmitted to the host further comprises the second resource identifier.

13. The method of claim 12, wherein the host is or comprises a second CHF.

14. A non-transitory computer readable storage medium storing a computer program comprising instructions which when executed by processing circuitry of a charging function causes the charging function to perform the method of claim 1.

15. A non-transitory computer readable storage medium storing a computer program comprising instructions which when executed by processing circuitry of a charging function causes the charging function to perform the method of claim 2.

16. A charging function (CHF), the CHF comprising:

processing circuitry; and a memory, the memory containing instructions executable by the processing circuitry, wherein the CHF is configured to:

receive a first request message transmitted by a first network function, wherein the first request message relates to a chargeable service requested by a subscriber;

after receiving the first request message, transmit a second request message to a second network function and receiving from the second network function a first response message responsive to the second request message, wherein the first response message includes a first resource identifier identifying a first resource created by the second network function or a third network function; and after receiving the first response message transmitted by the second network function, transmit to the first network function a second response message responsive to the first request message, wherein the second response message includes the first resource identifier received from the second network function.

17. A charging function (CHF), the CHF comprising:

a receiver for receiving a charging data request message transmitted by a network function, wherein the charging data request message is not an initial charging data request message, and the charging data request message comprises a first resource identifier comprising a first host portion identifying a host and a first specific resource identifier portion;

a transmitter;

processing circuitry; and a memory, the memory containing instructions executable by the processing circuitry, wherein the CHF is configured to:

employ the transmitter to transmit a request message to the host identified by the host portion of the first resource identifier, wherein the request message comprises the first specific resource identifier portion.

18. The CHF of claim 17, wherein the charging data request message comprises a set of resource identifiers including the first resource identifier and a second resource identifier, and the request message transmitted to the host further comprises the second resource identifier.

19. A charging function (CHF), the CHF comprising:

processing circuitry; and a memory, the memory containing instructions executable by the processing circuitry, wherein the CHF is configured to perform a method comprising:

receiving a first request message transmitted by a first network function, wherein the first request message relates to a chargeable service requested by a subscriber;

after receiving the first request message, transmitting a second request message to a second network function;

receiving from the second network function a first response message responsive to the second request message, wherein the first response message includes a first resource identifier identifying a first resource created by the second network function or a third network function;

after receiving the first response message transmitted by the second network function, transmitting to the first network function a second response message responsive to the first request message, wherein the second response message includes the first resource identifier received from the second network function;

receiving a charging data request message transmitted by a network function, wherein the charging data request message is not an initial charging data request message, and the charging data request message comprises a first resource identifier comprising a first host portion identifying a host and a first specific resource identifier portion; and transmitting a request message to the host identified by the host portion of the first resource identifier, wherein the request message comprises the first specific resource identifier portion.

20. The method of claim 2, wherein the first request message is an initial charging data request message, and the second response message is a charging data response message responsive to the initial charging data request message.

21. The method of claim 2, wherein the second network function is a Rating Function (RF), the second request message is a rate request message, the first response message is a rate response message responsive to the rate request message, the rate response message further includes, in addition to the first resource identifier, information indicating an amount to reserve, and the first resource identified by the first resource identifier was created by the RF.

22. The method of claim 2, wherein the second network function is an Account Balance Management Function (ABMF), the second request message is a reservation request message, the first response message is a reservation response message responsive to the reservation request message, the reservation response message further includes, in addition to the first resource identifier, information indicating a reserved amount, and the first resource identified by the first resource identifier was created by the ABMF.

23. The method of claim 22, wherein the method further comprises:

after receiving the first request message and prior to transmitting the second request message, the first CHF determining, based on information included in the first request message, that the first CHF needs to obtain account information from an ABMF;

as a result of determining the need to obtain the account information, the first CHF transmitting to the ABMF an account data request message requesting the account information; and the first CHF receiving from the ABMF an account data response message comprising the account information.

24. The method of claim 20, wherein the method further comprises:

before transmitting the second response message to the first network function, the first CHF determining that the chargeable service is chargeable by a second CHF, wherein the second CHF is the second network function; and as a result of determining that the chargeable service is chargeable by the second CHF, the first CHF transmitting to the second CHF the second request message, wherein the second request message is a second charging data request message.

* * * * *